United States Patent [19]

Deckers et al.

[11] Patent Number: 5,393,817

[45] Date of Patent: Feb. 28, 1995

[54] MOLDING MATERIALS BASED ON POLYMETHYL METHACRYLATE AND HAVING IMPROVED NOTCHED IMPACT STRENGTH

[75] Inventors: Andreas Deckers, Ludwigshafen; Norbert Guentherberg, Speyer; Norbert Niessner, Friedelsheim, all of Germany

[73] Assignee: BASF Aktiengesellschaft, Ludwigshafen, Germany

[21] Appl. No.: 180,068

[22] Filed: Jan. 11, 1994

[30] Foreign Application Priority Data

Jan. 13, 1993 [DE] Germany ............... 4300596

[51] Int. Cl.$^6$ ............... C08K 5/24; C08L 31/02; C08G 63/48
[52] U.S. Cl. ............... 524/269; 525/80; 525/81; 525/100; 525/64; 525/63; 525/306; 525/902
[58] Field of Search ............... 524/269; 525/80, 81, 525/100, 64, 63, 306, 902

[56] References Cited

U.S. PATENT DOCUMENTS

| | | | |
|---|---|---|---|
| 3,678,133 | 7/1972 | Ryan | 260/876 R |
| 3,793,402 | 2/1974 | Owens | 525/81 |
| 3,919,157 | 11/1975 | Ide et al. | 260/29.7 |

FOREIGN PATENT DOCUMENTS

| | | |
|---|---|---|
| 2253689 | 5/1973 | Germany . |
| 3821337 | 12/1989 | Germany . |
| 2045547 | 2/1990 | Japan . |

OTHER PUBLICATIONS

*Derwent Publications Ltd.*, Week 9013, AN 90-094618 (English Abstract of JP-A 2045547).

Primary Examiner—Paul R. Michl
Assistant Examiner—La Vonda R. DeWitt
Attorney, Agent, or Firm—Keil & Weinkauf

[57] ABSTRACT

Molding materials based on polymethyl methacrylate comprising essentially

A) from 99.99 to 95.0% by weight of a mixture comprising essentially
  a$_1$) from 5 to 95% by weight of polymethyl methacrylate, obtainable by polymerizing a mixture comprising essentially
    a$_{11}$) from 80 to 100% by weight of methyl methacrylate and
    a$_{12}$) from 0 to 20% by weight of a $C_1$–$C_{20}$-alkyl ester of acrylic acid, and
  a$_2$) from 95 to 5% by weight of a multistage graft copolymer based on a $C_1$–$C_{20}$-alkyl ester of acrylic and/or methacrylic acid and
B) from 0.01 to 5.0% by weight of a polysiloxane of the general formula I

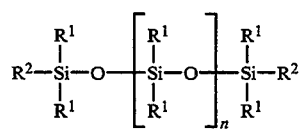

where
$R^1$ is $C_1$–$C_6$-alkyl or $C_6$–$C_{10}$-aryl,
$R^2$ is hydroxy-$C_1$–$C_6$-alkyl or amino-$C_1$–$C_6$-alkyl, and
n is a natural number from 5 to 200.

4 Claims, No Drawings

MOLDING MATERIALS BASED ON POLYMETHYL METHACRYLATE AND HAVING IMPROVED NOTCHED IMPACT STRENGTH

DESCRIPTION

The present invention relates to molding materials based on polymethyl methacrylate, comprising essentially A) from 99.99 to 95.0% by weight of a mixture comprising essentially
  a1) from 5 to 95% by weight of polymethyl methacrylate, obtainable by polymerizing a mixture comprising essentially
    a11) from 80 to 100% by weight of methyl methacrylate and
    a12) from 0 to 20% by weight of a $C_1$–$C_{20}$-alkyl ester of acrylic acid, and
  a2) from 95 to 5% by weight of a multistage graft copolymer based on a $C_1$–$C_{20}$-alkyl ester of acrylic and/or methacrylic acid and
B) from 0.01 to 5.0% by weight of a polysiloxane of the general formula I

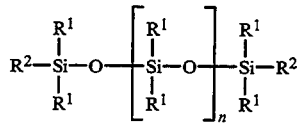

where
$R^1$ is $C_1$–$C_6$-alkyl or $C_6$–$C_6$-aryl,
$R^2$ is hydroxy-$C_1$–$C_6$-alkyl or amino-$C_1$–$C_6$-alkyl, and
n is a natural number from 5 to 200.

The present invention furthermore relates to a process for the preparation of the novel molding materials, their use for the production of moldings, and moldings containing the novel molding materials.

Polymethyl methacrylate molding materials (PMMA) possess in particular high weathering stability and transparency. However, the poor toughness of the moldings produced is disadvantageous in many cases. Multistage graft rubbers as described in DE-A 22 53 689 are therefore frequently mixed with the acrylic resin. As a rule, the transparency of PMMA is obtained by choosing a certain monomer composition of the modifier.

However, shaped articles produced from these toughened materials frequently break at the injection point (gate). This is due to the notched impact strength being too low.

DE-A 38 21 337 describes toughened PMMA materials having a high notched impact strength. The additives used are polysiloxanes. A disadvantage here, however, is that the polysiloxanes described lead to a substantial reduction in the light transmittance.

Moreover, an increase in the yellowness index is observed in many cases.

It is an object of the present invention to provide molding materials based on polymethyl methacrylate and having an improved notched impact strength in conjunction with high light transmittance and a low yellowness index.

We have found that this object is achieved by the molding materials based on polymethyl methacrylate and defined at the outset.

We have also found a process for the preparation of the novel molding materials, their use for the production of moldings, and moldings containing the novel molding materials.

Component A) is, according to the invention, a mixture comprising essentially from 5 to 95, preferably from 50 to 85, % by weight of polymethyl methacrylate, obtainable by polymerizing a mixture comprising essentially
  a11) from 80 to 100, preferably from 90 to 99, % by weight of methyl methacrylate and
  a12) from 0 to 20, preferably from 1 to 10, % by weight of a $C_1$–$C_{20}$-alkyl ester of acrylic acid, and from 95 to 5, preferably from 15 to 50, % by weight of a multistage graft polymer based on a $C_1$–$C_{20}$-alkyl ester of acrylic and/or methacrylic acid.

The $C_1$–$C_4$-alkyl esters, such as methyl acrylate (MA), ethyl acrylate, propyl acrylate, n-butyl acrylate, isobutyl acrylate and tert-butyl acrylate, and mixtures of these monomers are preferably used as $C_1$–$C_{20}$-alkyl esters of acrylic acid (component a12)), methyl acrylate being particularly preferred.

Observations to date have shown that polymers comprising 99% by weight of methyl methacrylate and 1% by weight of methyl acrylate and having a weight average molecular weight (Mw) of from 60,000 to 300,000, in particular from 80,000 to 150,000, g/mol are particularly advantageous.

The polymethyl methacrylate (component a1)) is prepared, as a rule, by known polymerization methods, such as mass, solution, emulsion or bead polymerization. Such processes are described in, for example, Kunststoffhandbuch, Vol. 9, Vieweg and Esser; Polymethylmethacrylat, Carl-Hanser-Verlag, Munich, 1975, page 36 et seq.

According to the invention, graft copolymers based on a $C_1$–$C_{20}$-alkyl ester of acrylic and/or methacrylic acid are used as multistage graft copolymers (component a2)).

Graft copolymers which have a rigid core and a rigid outer shell are preferably used. Further shells can preferably be incorporated between the core and the outer shell, an alternating sequence of the shells with regard to their glass transition temperatures being particularly preferred. For example, a three-stage graft copolymer preferably consists of a rigid core, a first flexible shell and a final rigid shell. A five-stage graft copolymer preferably has the sequence rigid (core)-flexible-rigid-flexible-rigid (outer shell). Rigid is to be understood as meaning a non-elastomeric phase having a glass transition temperature of at least 50° C., while flexible is to be understood as meaning an elastomeric phase having a glass transition temperature of less than 25° C.

Particularly preferred multistage graft copolymers are obtainable by Polymerization of from 5 to 25, preferably from 10 to 20, % by weight of a monomer mixture comprising essentially
  a211) from 85 to 100, preferably from 95 to 99, % by weight of methyl methacrylate, .
  a212) from 0 to 5, preferably from 0.5 to 2.5, % by weight of a crosslinking agent and
  a213) from 0 to 10, preferably from 0.5 to 2.5, % by weight of a graft-linking agent, subsequent polymerization, in the presence of the polymer obtained after stage a21), of from 40 to 80, preferably from 50 to 70, % by weight of a monomer mixture comprising essentially a$_{221}$) from 0 to 40, preferably from 14.5 to 25, % by weight of a vinylaromatic monomer, a$_{222}$) from 60 to 100, preferably from 85 to 73, % by weight of a C$_1$-C$_{20}$-alkyl ester of acrylic acid and a$_{223}$) from 0 to 5, preferably from 0.5 to 2, % by weight of a graft-linking agent, and subsequent polymerization, in the presence of the polymer obtained after stage a$_{22}$), of from 10 to 35, preferably from 15 to 30, % by weight of a monomer mixture comprising essentially a$_{231}$) from 80 to 100, preferably from 90 to 99, % by weight of methyl methacrylate and a$_{232}$) from 0 to 20, preferably from 1 to 10, % by weight of a C$_1$-C$_{20}$-alkyl ester of acrylic acid, the percentages by weight of the monomer mixtures used in the particular stages summing to 100% by weight.

Examples of suitable crosslinking agents (component a$_{212}$)) are vinylically unsaturated compounds having at least two double bonds, such as alkylene glycol di (meth) acrylates, e.g. ethylene glycol di(meth)acrylate, 1,2-propanediol di(meth)acrylate, 1,3-propanediol di(meth)acrylate, 1,3-propanediol di(meth)acrylate, 1,4-butanediol di(meth)acrylate, oligo- and polyethylene glycol di(meth)acrylates, acrylates and methacrylates of glycerol, trimethylolpropane, pentaerythritol, inositol and similar sugar alcohols, acrylamides and methacrylamides of 5 ethylenediamine and other aliphatic di- and polyamines, triallyl cyanurate and triallyl isocyanurate, and vinylbenzenes, such as divinylbenzene and trivinylbenzene.

The use of component a$_{212}$) as a crosslinking agent is not absolutely essential but is preferred.

Owing to their property of being simultaneously incorporated into the polymeric phase, the abovementioned crosslinking agents are also referred to as polymerization crosslinking agents. During the polymerization reaction, the rate of their consumption is essentially comparable with that of the main monomer, with the result that crosslinking occurs within the phase.

Suitable graft-linking agents (component a$_{213}$)) are dicyclopentadienyl and allyl, methallyl and crotyl esters of an α,β-unsaturated carboxylic acid or dicarboxylic acid, preferably allyl methacrylate.

Graft-linking comonomers ensure external crosslinking and, for example, effect linking of the core phase with the subsequent polymerization stage during synthesis of an emulsion graft copolymer. Graft-linking agents, such as allyl methacrylate, exhibit this behavior because a polymerizable double bond (double bond of the acid moiety) polymerizes at a rate comparable with that of the main monomer (methyl methacrylate). On the other hand, the double bond of the allyl group reacts at a substantially lower polymerization rate, so that some of these double bonds are retained unchanged in the core phase at the end of the polymerization, permitting graft-linking between two phases.

Observations to date have shown that more than 10% by weight of the graft-linking agent (component a$_{213}$)) leads to insufficient impact strengths.

Preferred vinylaromatic monomers (component a$_{221}$)) are styrene, α-methylstyrene, tert-butylstyrene, monochlorostyrene and vinyltoluene, particularly preferably styrene and α-methylstyrene.

The C$_1$-C$_4$-alkyl esters, such as methyl acrylate (MA), ethyl acrylate, propyl acrylate, n-butyl acrylate, isobutyl acrylate and tert-butyl acrylate, and mixtures of these monomers are preferably used as C$_1$-C$_{20}$-alkyl esters of acrylic acid (component a$_{222}$)), methyl acrylate being particularly preferred.

Preferred graft-linking agents (component a$_{223}$)) are the compounds stated in the case of component a$_{213}$).

The graft copolymer is prepared, as a rule, by known polymerization methods, for example emulsion polymerization. Such methods are described in, for example, DE-A 22 53 689.

The novel polymethyl methacrylate (component a$_1$)) and the novel graft copolymer (component a$_2$)) are mixed in general in the plastified state in a conventional manner, for example in screw kneaders, in particular twin-screw extruders.

The amount of component A) is from 99.99 to 95.0, preferably from 99.0 to 99.95, % by weight, based on the total weight of the novel molding materials.

Component B) is a polysiloxane of the abovementioned formula I, where R$^1$ is, according to the invention, C$_1$-C$_6$-alkyl, such as methyl, ethyl, n-propyl, isopropyl, n-butyl, isobutyl, sec-butyl, tert-butyl, pentyl or hexyl, in particular methyl or ethyl, or C$_6$-C$_{10}$-aryl, such as phenyl or naphthyl, in particular phenyl, R$^2$ is, according to the invention, hydroxy-C$_1$-C$_6$-alkyl or amino-C$_1$-C$_6$-alkyl, such as hydroxymethyl, hydroxyethyl, hydroxy-n-propyl, hydroxyisopropyl, hydroxybutyl, hydroxypentyl, hydroxyhexyl, aminomethyl, aminoethyl, amino-n-propyl, amino-isopropyl, aminobutyl, aminopentyl or aminohexyl, preferably hydroxy-n-propyl, hydroxyisopropyl and amino-n-propyl and aminoisopropyl.

The degree of polymerization n is from 5 to 200, preferably from 10 to 150, particularly preferably from 20 to 100. Suitable products on the one hand are available as commercial products, for example under the name Tegomer ® from Th. Goldschmidt AG or as silicones from Wacker-Chemie GmbH, and on the other hand can be prepared by known methods (cf. I. Yilgör, J. E. McGrath in Advances in Polymer Science, Vol. 86, Springer-Verlag 1988, pages 1-86).

The novel molding materials may furthermore contain from 0 to 2, preferably from 0.05 to 0.5, % by weight, based on the total weight of components A) and B), of processing stabilizers, such as antioxidants and heat stabilizers.

Examples of antioxidants are sterically hindered phenols, such as triethylene glycol bis (3,3-tert-butyl-4-hydroxy-5-methylphenyl)-propionate, 1,6-hexanediol bis-3-(3,5-di-tert-butyl-4-hydroxyphenyl)propionate, 4-[[4,6-bis octyl-thio)-1,3,5-triazin-2-yl]-amino]-2,6-bis(1,1-dimethylethyl)phenol, pentaerythrityl tetrakis-[3-(3,5-di-tert-butyl-4-hydroxyphenyl)propionate and octadecyl 3-(3,5-di-tert-butyl-4-hydroxyphenyl)propionate.

Examples of heat stabilizers are bisstearyl pentaerythrityl diphosphite, tris(nonylphenyl) phosphite, triphenyl phosphate and tris (2,4-di-tert-butylphenyl) phosphite.

As a rule, all conventional apparatuses for mixing melts are suitable for the preparation of the novel molding materials. A twin-screw extruder is preferably used, and the components are processed at from 200° to 300° C.

Moldings can be produced from the novel molding materials by injection molding or blow molding. The molding materials may also be compression molded, calendered, extruded or vacuum formed.

Compared with prior art molding materials, the novel molding materials have improved notched impact strength in conjunction with very good transparency and a low yellowness index.

EXAMPLE

The novel molding materials were compounded in a conventional manner in a twin-screw extruder at from 240° to 300° C. and injection molded at temperatures typical for polymethyl methacrylate (PMMA) (200°–240° C.).

The notched impact strength $a_k$ was tested according to DIN 53,453-k on a standard small bar.

The optical properties (transparency, yellowness index and haze) were measured using circular discs (80 mm × 6 mm) according to DIN 5,036.

The following materials were used:
Component A):

60 parts by weight of a copolymer of 99% by weight of MMA and 1% by weight of MA ($M_w$=100,000) and 40 parts by weight of a multishell rubber consisting of 15% by weight of PMMA (crosslinked with 0.5% by weight of 1,4-butanediol dimethacrylate, core), 65% by weight of a copolymer obtained from 82% by weight of n-butyl acrylate and 18% by weight of styrene (1st shell) and 20% by weight of PMMA (2nd shell).

| Component B): | |
|---|---|
| Polysiloxane 1: (PS1) | $R^1$ = CH$_3$, $R^2$ = —CH$_2$—CH$_2$—CH$_2$—NH$_2$, Weight average molecular weight ($M_w$) = 4500 g/mol; |
| Polysiloxane 2: (PS2) | $R^1$ = CH$_3$, $R^2$ = —CH$_2$—CH$_2$—CH$_2$—OH, Weight average molecular weight ($M_w$) = 6500 g/mol; |
| Polysiloxane 3: (PS3) | $R^1$ = CH$_3$, $R^2$ = OH, Weight average molecular weight ($M_w$) = 500 g/mol, ie. n < 5. |

The table below shows the compositions of the novel mixtures and the results of the optical evaluation and of the notched impact strength ($a_k$).

| No. | Polysiloxane [% by wt.] | Stabilizer[1] [% by wt.] | $a_k$ [kJ/m$^2$] | Yellowness index $Y_i$ | Light transmittance [%] | Haze [%] |
|---|---|---|---|---|---|---|
| according to the invention | | | | | | |
| 1 | 0.05 PS1 | — | 2.5 | 1.4 | 89.3 | 2.0 |
| 2 | 0.05 PS1 | 0.01 | 2.8 | 0.9 | 89.2 | 1.9 |
| 3 | 0.05 PS2 | — | 2.2 | 0.8 | 90.2 | 1.6 |
| 4 | 0.20 PS2 | — | 2.4 | 0.9 | 90.0 | 1.8 |
| for comparison | | | | | | |
| 5 | — | — | 1.6 | 0.8 | 90.0 | 1.5 |
| 6 | 0.05 PS3 | — | 1.5 | 3.7 | 86.8 | 2.9 |
| 7 | 0.20 PS3 | — | 2.2 | 19.5 | 63.6 | 29.6 |

[1]Irganox B 900 ® (mixture of 4 parts of tris(2,4-di-tert-butyl-phenyl) phosphite and 1 part of octadecyl 3-(3,5-di-tert-butyl-4-hydroxyphenyl)propionate from Ciba-Geigy).

We claim:

1. A molding material based on polymethyl methacrylate, comprising
   A) from 99.99 to 95.0% by weight of a mixture comprising
      a$_1$) from 5 to 95% by weight of polymethyl methacrylate, obtained by polymerizing a mixture comprising
         a$_{11}$) from 80 to 100% by weight of methyl methacrylate and
         a$_{12}$) from 0 to 20% by weight of a C$_1$-C$_{20}$-alkyl ester of acrylic acid, and
      a$_2$) from 95 to 5% by weight of a multistage graft copolymer based on a C$_1$-C$_{20}$-alkyl ester of acrylic and/or methacrylic acid and
   B) from 0.01 to 5.0% by weight of a polysiloxane of the formula I

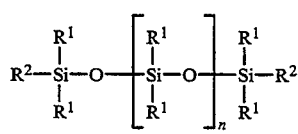

where
$R^1$ is C$_1$-C$_6$-alkyl or C$_6$-C$_{10}$-aryl,
$R^2$ is hydroxy-C$_1$-C$_6$-alkyl or amino-C$_1$-C$_6$-alkyl, and
n is a natural number from 5 to 200.

2. A molding material based on polymethyl methacrylate as defined in claim 1, wherein a three-stage graft copolymer which is obtained by
   a$_{21}$) polymerization of from 5 to 25% by weight of a monomer mixture comprising
      a$_{211}$) from 85 to 100% by weight of methyl methacrylate,
      a$_{212}$) from 0 to 5% by weight of a crosslinking agent and
      a$_{213}$) from 0 to 10% by weight of a graft-linking agent,
   a$_{22}$) subsequent polymerization, in the presence of the polymer obtained after stage a$_{21}$), of from 40 to 80% by weight of a monomer mixture comprising
      a$_{221}$) from 0 to 40% by weight of a vinylaromatic monomer,
      a$_{222}$) from 60 to 100% by weight of a C$_1$-C$_{20}$-alkyl ester of acrylic acid and
      a$_{223}$) from 0 to 5% by weight of a graft-linking agent and
   a$_{23}$) subsequent polymerization, in the presence of the polymer obtained after stage a$_{22}$), of from 10 to 35% by weight of a monomer mixture comprising
      a$_{231}$) from 80 to 100% by weight of methyl methacrylate and
      a$_{232}$) from 0 to 20% by weight of a C$_1$-C$_{20}$-alkyl ester of acrylic acid,
   the percentages by weight of the monomer mixtures used in the particular stages summing to 100% by weight,
is used as the multistage graft copolymer based on a C$_1$-C$_{20}$-alkyl ester of acrylic and/or methacrylic acid.

3. A process for the preparation of a molding material as defined in claim 1, comprising mixing a melt of essentially
   A) from 99.99 to 95.0% by weight of a mixture comprising
      a$_1$) from 5 to 95% by weight of polymethyl methacrylate, obtained by polymerization of a mixture comprising
         a$_{11}$) from 80 to 100% by weight of methyl methacrylate and
         a$_{12}$) from 0 to 20% by weight of a C$_1$-C$_{20}$-alkyl ester of acrylic acid, and a2) from 95 to 5% by weight of a multistage graft polymer based on a $C_1$–$C_{20}$-alkyl ester of acrylic and/or methacrylic acid and
B) from 0.01 to 5.0% by weight of a polysiloxane of the formula I
where
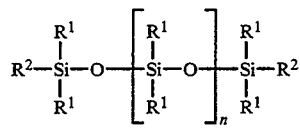
$R^1$ is $C_1$–$C_6$-alkyl or $C_6$–$C_{10}$-aryl,
$R^2$ is hydroxy-$C_1$–$C_6$-alkyl or amino-$C_1$–$C_6$-alkyl and
n is a natural number from 5 to 200.
4. A molding obtained from a molding material as defined in claim 1.
* * * * *